United States Patent
MacBeth

Patent Number: 6,010,310
Date of Patent: Jan. 4, 2000

[54] FAN CONTROLLER FOR REDUCING HARMONIC FLUXUATIONS THAT PRODUCES AUDIBLE SOUNDS

[75] Inventor: Bruce F. MacBeth, Syracuse, N.Y.

[73] Assignee: Pass & Seymour, Inc., Syracuse, N.Y.

[21] Appl. No.: 08/906,636

[22] Filed: Aug. 7, 1997

Related U.S. Application Data

[60] Provisional application No. 60/023,714, Aug. 8, 1996.

[51] Int. Cl.⁷ .................................................. F04B 49/06
[52] U.S. Cl. ........................................... 417/44.1; 417/22
[58] Field of Search .............................. 417/44.1, 24, 42, 417/45, 44.11, 22, 46, 18; 318/221 E

[56] References Cited

U.S. PATENT DOCUMENTS

| | | | |
|---|---|---|---|
| 3,761,792 | 9/1973 | Witney et al. ........................ | 318/221 E |
| 4,358,730 | 11/1982 | Beifus ..................................... | 323/322 |
| 4,388,578 | 6/1983 | Green et al. ............................ | 318/729 |
| 4,499,408 | 2/1985 | Bitting et al. ........................... | 318/254 |
| 4,935,736 | 6/1990 | Meierdierck ........................ | 340/825.69 |
| 5,019,717 | 5/1991 | McCurry et al. ......................... | 307/66 |
| 5,479,557 | 12/1995 | Ganz et al. .............................. | 388/829 |

Primary Examiner—Charles G. Freay
Assistant Examiner—Robert Z. Evora
Attorney, Agent, or Firm—Harter, Secrest & Emery LLP; Stephen B. Salai

[57] ABSTRACT

A motor speed controller for a shaded pole ceiling fan motor having low audible noise, includes a burst period generator for generating gating signals of a duration varying between a preselected minimum equal to at least one wavelength of an AC drive signal to the motor, and a maximum equal to a large number of wavelengths, and a controlled switch such as a triac, connected between the power source and fan motor, and having a gate terminal connected to the burst period generator.

14 Claims, 6 Drawing Sheets

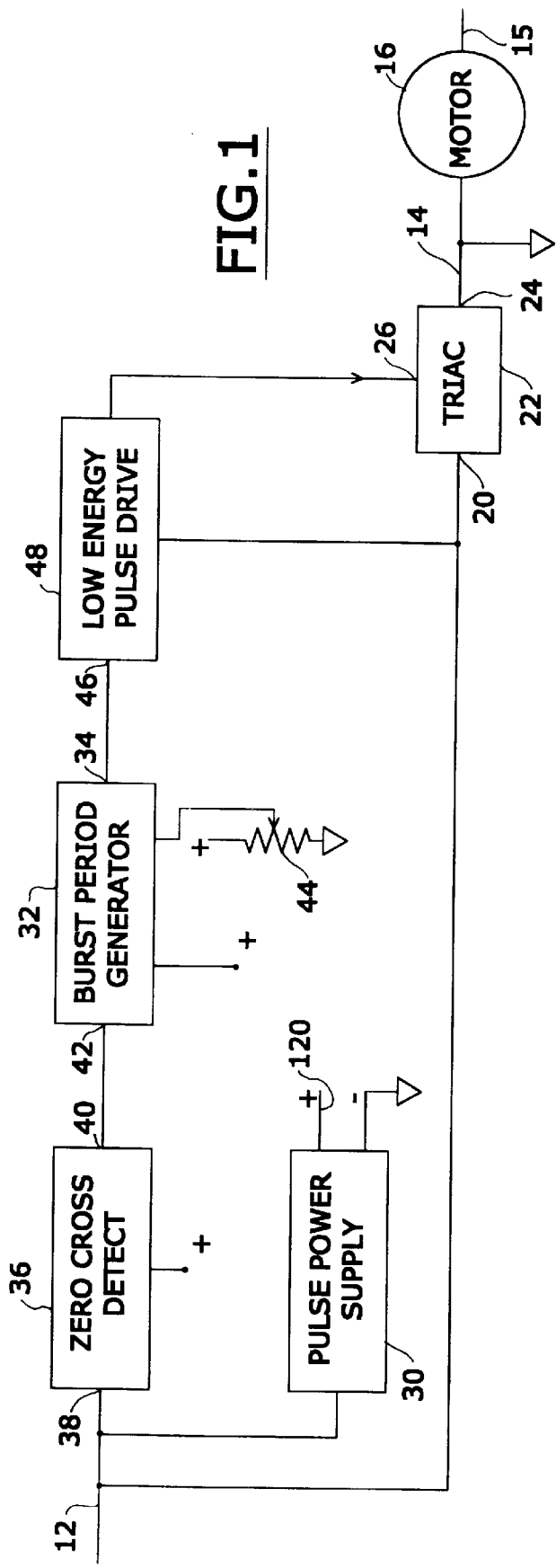
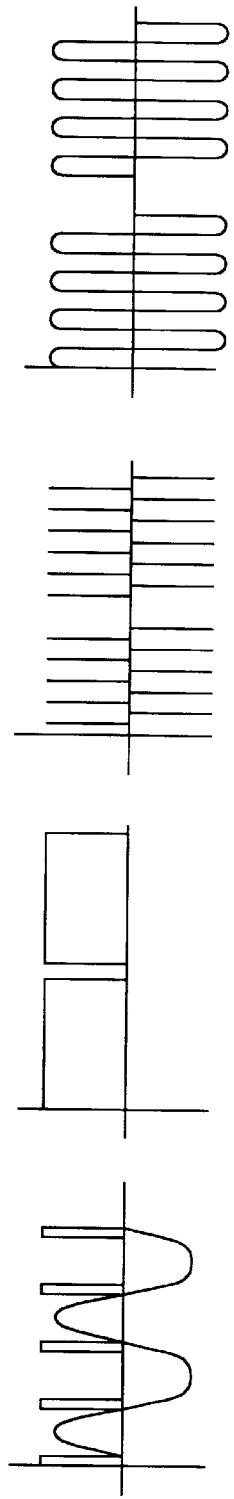

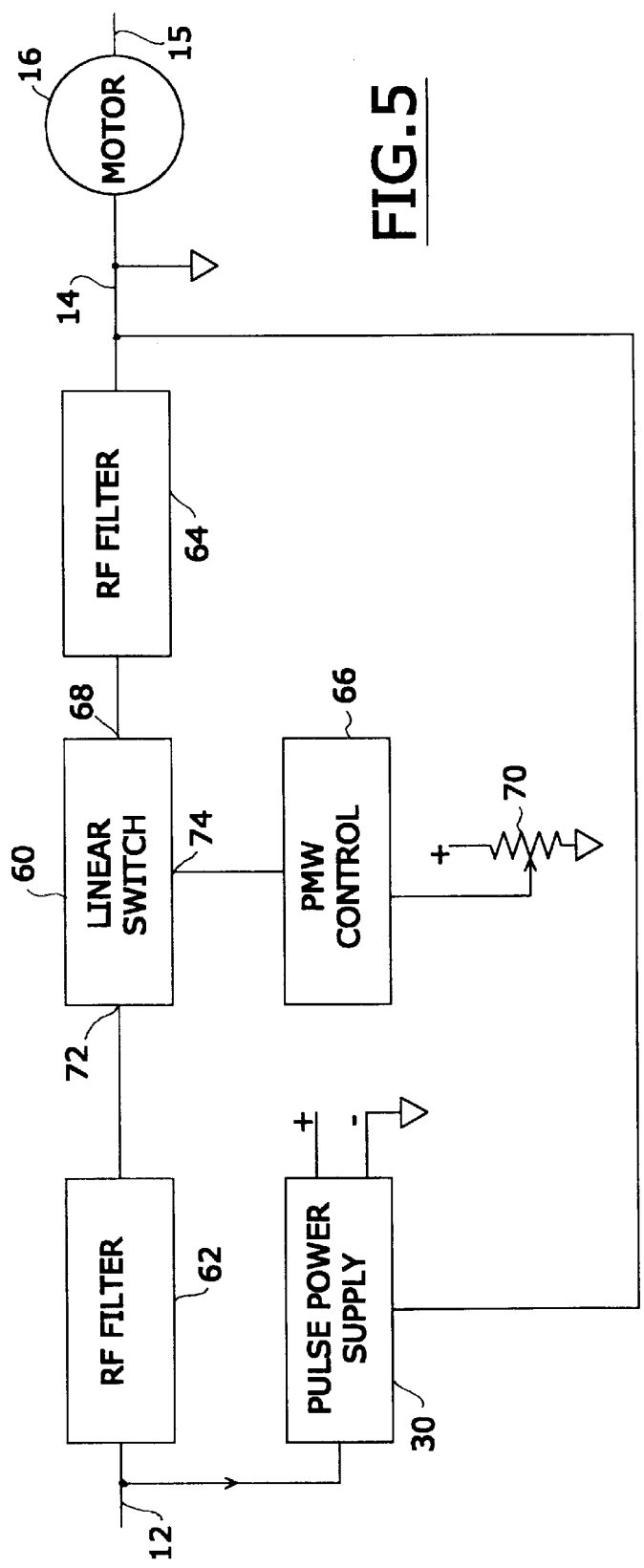
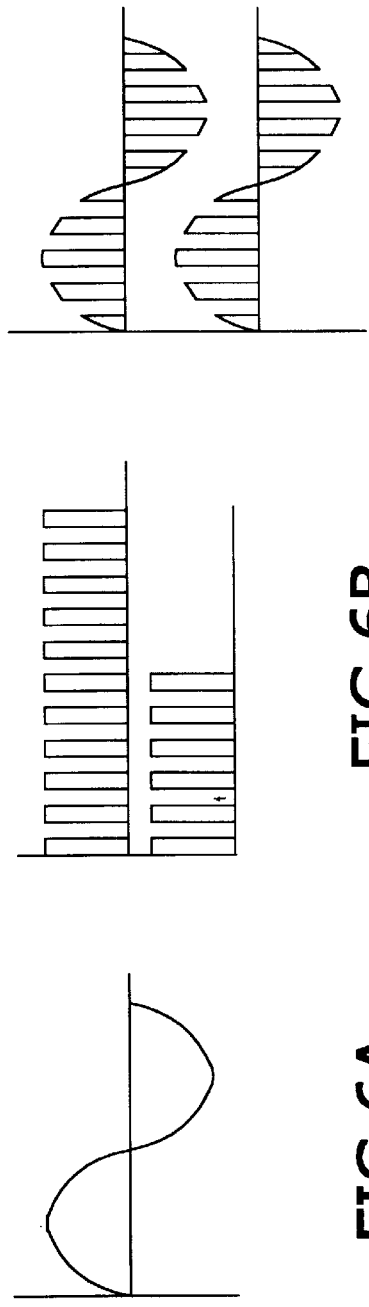

6,010,310

FAN CONTROLLER FOR REDUCING HARMONIC FLUXUATIONS THAT PRODUCES AUDIBLE SOUNDS

CROSS REFERENCE TO RELATED APPLICATION

This application is a continuation of Provisional Application No. 60/023,714, filed Aug. 8, 1996.

Statement Regarding Federally Sponsored Research or Development not applicable.

FIELD OF THE INVENTION

This invention relates generally to motor speed controllers, and more particularly to a controller for shaded pole or split capacitor motors of the type commonly used in overhead ceiling fans.

DESCRIPTION OF THE RELATED ART

It is desirable to control the speed at which overhead ceiling fans rotate to accommodate different conditions. When the ambient temperature is close to or within a comfortable range, low rotational speeds are adequate to provide air circulation and enhance comfort. As the temperature increases, higher speeds are needed to maintain comfortable conditions within a room.

Heretofore, ceiling fan motors have been controlled with electronic controllers of the same type used to dim incandescent lamps. These controllers, sometimes referred to as phase controllers, use an SCR or triac to control voltage applied to the fan motor to allow voltage to pass to the motor beginning at different points in the sine wave. While these controllers effectively vary the speed of ceiling fan motors, they produce fast rising voltage pulses and create harmonics in the frequency domain. These fast rising pulses and harmonics cause singing in the motor winding coils, and may cause associated metal parts to resonate. The sounds produced by the harmonics may be quite loud and annoying in a residential or quiet business environment.

In addition to creating audible noise, harmonics may extend into the AM broadcast band, and cause annoying buzzing in radios. The radio frequency harmonics can be suppressed to some degree with known noise suppression techniques, such as the use of inductors and capacitors to create filters for these bands, but these filters do not affect the audible range.

BRIEF SUMMARY OF INVENTION

It is an object of this invention to provide a motor speed controller for a shaded pole or split capacitor motor, for convenience referred to generically as a ceiling fan motor, more particularly to provide a controller for a ceiling fan motor that allows the speed of the motor to be controlled without producing fast rising pulses or harmonics that generate audible sounds.

Briefly stated, in accordance with a presently preferred embodiment of the invention, a motor speed controller for a shaded pole ceiling fan motor having low audible noise, includes a burst period generator for generating gating signals of a duration varying between a preselected minimum equal to at least one wavelength of an AC drive signal to the motor, and a maximum equal to a large number of wavelengths, and a controlled switch such as a triac, connected between the power source and fan motor, and having a gate terminal connected to the burst period generator.

In accordance with another aspect of this invention, a motor speed controller for a shaded pole ceiling fan motor having low audible noise includes a linear switch connected between an AC power source and the shaded pole ceiling fan motor, the linear switch having a gate terminal, and a pulse width modulated controller having a pulse with modulated output with a fundamental frequency above the audible range, connected to the gate terminal.

In accordance with still another aspect of the invention, a motor speed controller for a shaded pole ceiling fan motor having low audible noise includes a linear switch connected between an AC power source and the shaded pole ceiling fan motor, the switch having a gate terminal, and a controller connected to the gate terminal for turning the linear switch on at each zero crossing, and turning the linear switch off during each cycle, and allowing the voltage to decay at a rate that minimizes the generation of harmonics.

SEVERAL VIEWS OF THE DRAWINGS

The novel aspects of the invention are set forth with particularity in the appended claims. The invention itself, together with further objects and advantages thereof, may be more readily understood by reference to the following detailed description of presently preferred embodiments thereof, taken in conjunction with the accompanying drawings in which:

FIG. 1 is a block diagram of a motor speed controller in accordance with a first embodiment of the invention;

FIGS. 2A–2D are wave form diagrams showing signals appearing at various points in the block diagram of FIG. 1;

FIG. 5 is a block diagram of a motor speed controller in accordance with yet another aspect of the invention;

FIGS. 6A–6C are wave form diagrams showing voltages appearing in FIG. 5;

DETAILED DESCRIPTION OF THE INVENTION

Figure 3:
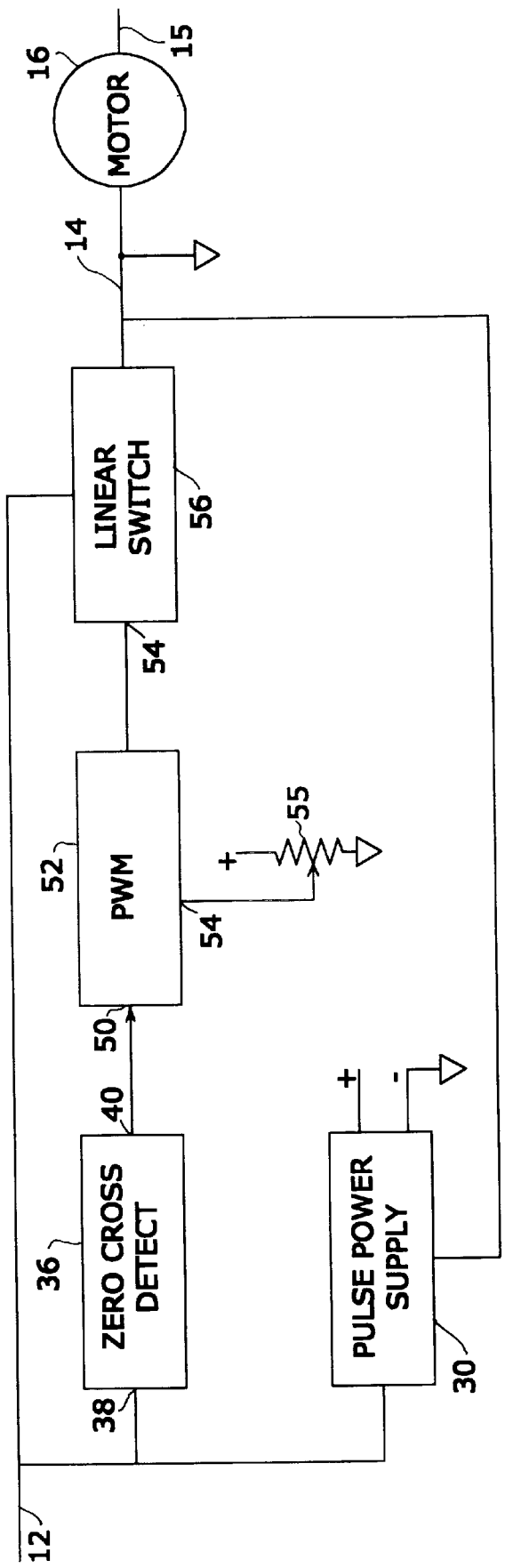
FIG. 3 is a block diagram of a motor speed controller in accordance with another aspect of the invention.

Referring now to FIG. 1, a motor speed controller in accordance with a presently preferred embodiment of this invention is illustrated in block diagram form. The controller is designed to be inserted in an electrical circuit between a source of power connected to an input terminal designated generally at 12, and one connection 14 of a motor 16, preferably a shaded pole or split capacitor motor, heretofore referred to as a fan motor(s). It will be understood that the other connection to the motor is connected to a neutral line, not shown. In accordance with conventional terminology, connection 12 is made to what is usually referred to as a hot line.

Hot lead 12 is connected to a first terminal 20 of a triac 22, which has its second switching terminal 24 connected to motor 16. Triac 22 is controlled by the application of control signals to gate terminal 26, as will be described shortly. Preferably, in accordance with this invention, to reduce power requirements, triac 22 may include a control triac connected to the gate of a higher power triac, as will be shown in more detail in FIG. 9.

A pulse power supply 30 is connected between hot lead 12 and connection 14 to motor 16 or to a ground leakage return, for developing a voltage to power the burst period generator 32 to be described below. The pulse power supply produces a positive voltage at an output terminal 120, which is connected to the burst period generator 32 and to a zero crossing detector 36, which has an input 38 connected to hot terminal 12 and an output 40 connected to an input 42 of the burst period generator 32. The zero crossing detector 36 produces a short pulse each time the AC signal on hot terminal 12 goes to zero, as shown in the wave form diagram of FIG. 2A. The zero crossing signals synchronize the start, and preferably the end of the burst timing signals produced by the burst period generator with the zero crossings to minimize harmonics. The burst period generator 32 is connected to a potentiometer 44 controller for adjusting the duty cycle of the burst period wave form generated at output terminal 34 of the burst period generator 32 and connected to an input terminal 46 of a low energy pulse drive 48. The output appearing at the terminal 34 of the burst period generator 32 is a pulse with modulated logic level square wave, as shown in FIG. 2B. The duty cycle of the square wave can be adjusted by adjusting the potentiometer 44 between a very low duty cycle, and an almost 100% duty cycle, as shown in FIG. 2B.

Whenever the output from the burst period generator is high, the low energy pulse drive 48 produces triac triggering signals as shown in FIG. 2C. The triac must be triggered each half cycle, in order to keep it in a conductive state, and the signals shown in FIG. 2C, which are coupled to the gate input 26 of triac 22 accomplish this. The low energy pulse drive circuit 48 has one terminal connected to hot lead 12, and is adapted to provide the alternating positive and negative going triac trigger pulses shown in FIG. 2C. Preferably, the low energy pulse drive circuit 48 is adapted to require very low current. Preferably, as shown in the schematic diagram of FIG. 9, it only provides a triggering pulse to the gate 26 of triac 22 when the triac commutates off while the output of the burst period generator is high. This conserves energy from the power supplied during long on periods. As is understood, the triac 22, once triggered, remains on until the voltage nears a subsequent zero crossing.

The voltage supplied to motor 16 is shown in FIG. 2D. The signal includes a plurality of cycles of the AC line voltage connected to terminal 12, interrupted during the periods when the burst period generator is low, as shown in FIG. 2B. The voltage to motor 16 is synchronized with the zero crossings, so that fast rise time pulses and subsequently the generation of harmonics are minimized.

FIG. 3 is a block diagram of a motor speed controller for a fan motor in accordance with an alternative embodiment of the invention. Like the motor speed controller of FIG. 1, this controller is designed to be connected in the hot lead of an electrical circuit that extends from a power source 12 to a first lead 14 of the fan motor 16. A second neutral connection is made from the neutral terminal of the power source to the other lead 15 of motor 16. The speed controller of this invention is designed so that it can replace, without rewiring, a conventional on/off switch for controlling the motor.

A zero crossing detector 36 has an input 38 connected to hot lead 12 and produces a train of narrow pulses at an output terminal 40 each time the input signal crosses zero. The zero crossing pulses are connected to an input terminal 50 of a pulse width modulator 52, which has a control terminal 54 connected to a potentiometer 55 for varying the width of the pulses produced by the pulse width modulator 52. The pulse width modulator 52 generates pulses whose leading edge is synchronized with the zero crossing of the voltage appearing at hot lead 12, and whose trailing edge occurs during each half cycle of the sine wave at a phase dependent on the setting of the potentiometer. For higher speeds, the width of the pulses approaches a full half wave, while for lower speeds the trailing edge occurs much earlier in each half cycle.

The output of the pulse width modulator 52 is connected to a gate input 54 of a linear switch 56 connected between the hot lead 12 and lead 14 to motor 16. Preferably, the linear switch is a high power field effect transistor, preferably a MOSFET, an insulated gate bipolar transistor, or any other transistor capable of linear switching at a voltage and current sufficient to energize motor 16. A triac or other commutating device cannot be used, because such devices, once switched on, remain on until the current through them drops towards zero. This invention relies on turning the switch off during the cycle, where an SCR or triac cannot be used.

A pulse power supply 30 is connected between hot lead 12 and motor lead 14 for supplying power to the pulse width modulator 52 during the time that the switch is on and no voltage can be developed across it. The power supply 30 functions substantially like the power supply 30 in the device of FIG. 1.

Figure 4C:
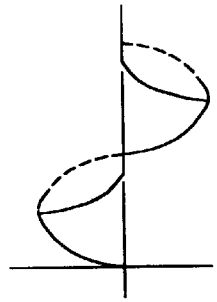
FIGS. 4A–4C are wave form diagrams of voltages appearing in the circuit of FIG. 3.
Figure 4B:
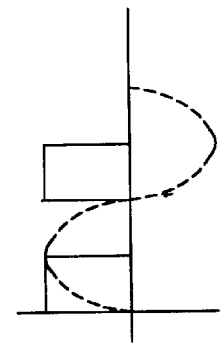
Figure 4A:
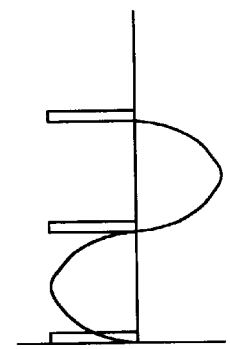

The outputs of the zero crossing detector 36, the pulse width modulator 52, and the linear switch 56 are shown in FIGS. 4A, 4B, and 4C. In each case, a sine wave is superimposed over the signals appearing at the outputs of the devices to show the timing.

A further embodiment of the invention is shown in block diagram form in FIG. 5. Like the arrangements of FIGS. 1 and 3, this ceiling fan motor speed control is especially adapted to be connected in a single line of a two or three wire electrical circuit, that is in the hot line 12 between a power source and the motor 16. A high power linear switching device 60 is connected in the hot lead 12 between an input terminal and a motor winding terminal 14, to control power to the motor 16. An RF filter 62 is connected between hot lead 12 and the linear switch 60, and a second RF filter 64 is connected between the linear switch 60 and motor 16. The RF filters are designed to attenuate harmonics generated by the fast rise time switching.

A pulse power supply 30 is connected to hot line 12 for generating power to the pulse width modulator 66 to be described below, during the time when the switch 60 is on, and insufficient voltage is available across the switch 60 to provide power to the pulse width modulated controller 66. The switch 60 has a gate terminal 68 that is connected to a pulse width modulated controller 66. The controller generates pulses for turning the linear switch on having a fundamental frequency above the audible range, that is about 25 kHz or more. A potentiometer 70 controls the duty cycle of the pulses. When low duty cycle pulses are produced, the motor runs at a low speed. Longer duty cycle pulses cause the motor to run at a higher speed.

Exemplary wave forms appearing at the input 72 to the linear switch 60, the gate input 74 of the linear switch, and the output 68 of the linear switch, are shown in FIGS. 6A, 6B, and 6C respectively. FIG. 6A shows a sine wave as would appear at the input to the linear switch. FIG. 6B shows two 25 kHz pulse width wave modulated gate signals, a first low duty cycle gauge signal and a second higher duty gauge signal. It will be understood that the figures show gate signals having a frequency much lower than 25 kHz, for clarity. FIG. 6C shows the output of the linear switch interrupted by the off periods of the gate signal. Again, the frequency of the gate signals is much lower in the drawing than it would be in practice.

Figure 7:
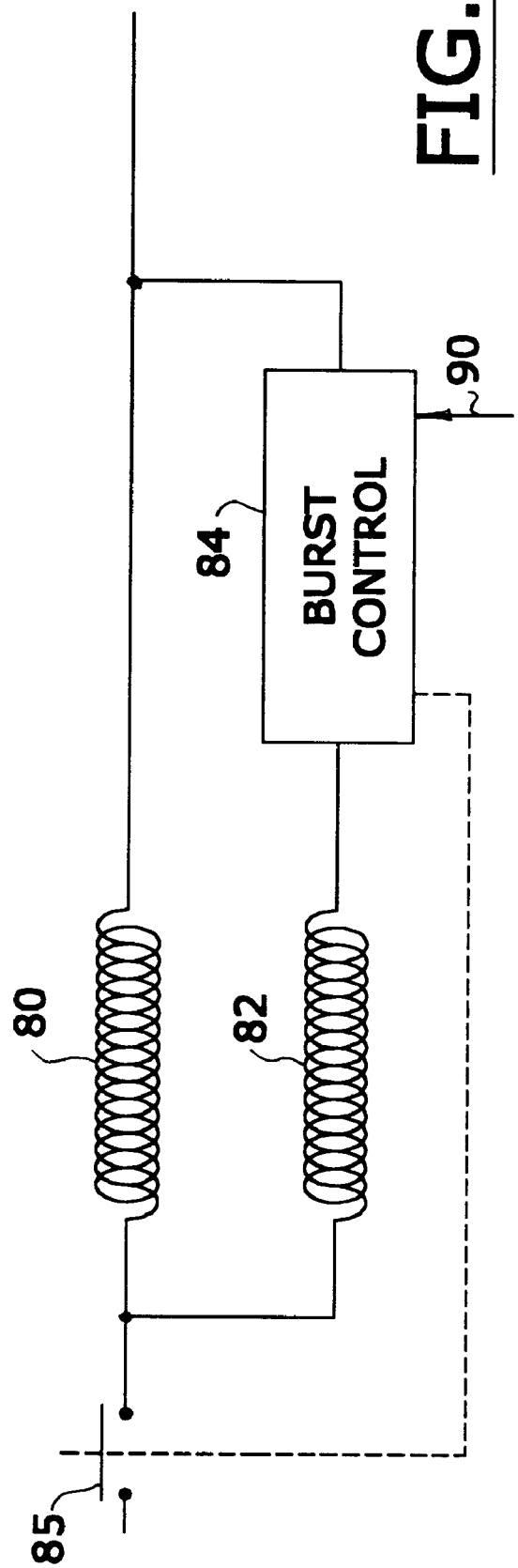
FIG. 7 is a block diagram showing the motor speed controller of FIG. 1 arranged to control the start winding of a shaded pole motor.

FIG. 7 shows an arrangement for incorporating a controller in accordance with this invention, that is the controllers of FIGS. 1, 3, or 5 in combination with a motor located in a ceiling fan.

Ceiling fan motors of the type to which this invention is addressed ordinarily include a run winding 80 and a start winding 82 connected in parallel. The motor speed controller of this invention is connected in series in a start winding leg of the circuit. Optionally, a normally open single pole single throw on/off switch 86 may be provided either at the fan motor, for example, a pull chain type control, or in a wall switch.

A control signal for the motor controller is connected to an input terminal 90 of the controller and may be a low voltage wire, or a remote control, such as an RF, infrared or ultrasonic controller. Preferably, the remote control provides the function of the potentiometer in any of FIGS. 1, 3, and 5.

Figure 8:
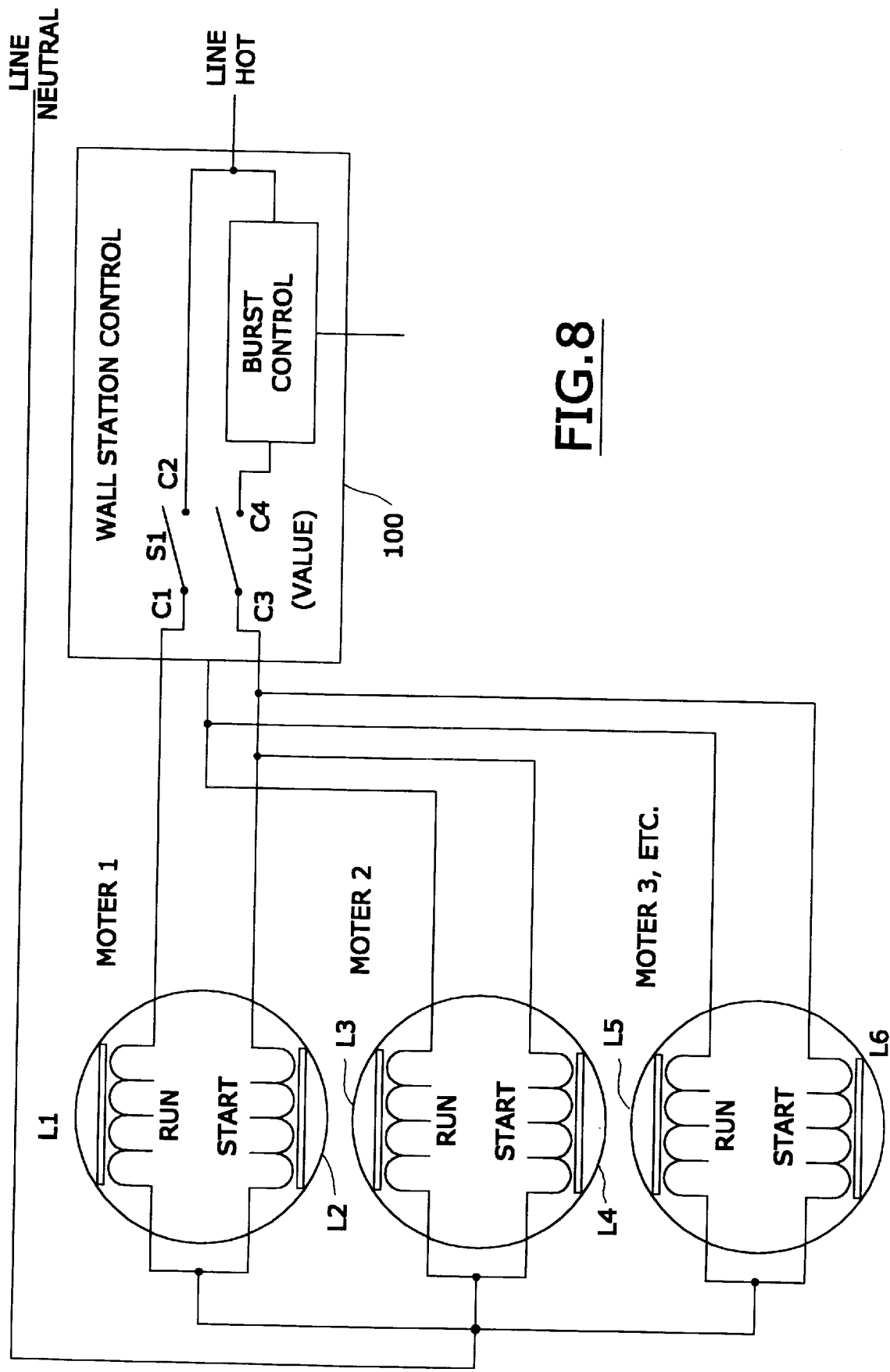
FIG. 8 is a block diagram of any of the controllers shown in FIGS. 1, 3, and 5 connected to control a plurality of shaded pole motors at the same time.

As shown in FIG. 8, multiple ceiling fans can be operated with a single speed controller. The run windings of the motors are connected in parallel in one branch, and the start windings of the motors are connected in parallel in another branch. The two branches are connected to the motor speed controller 100 in a manner substantially identical to that shown in FIG. 7. One end of each of the run and start windings is connected to the neutral line, while the run windings and output of the speed controller are connected to the hot electrical line.

Figure 9:
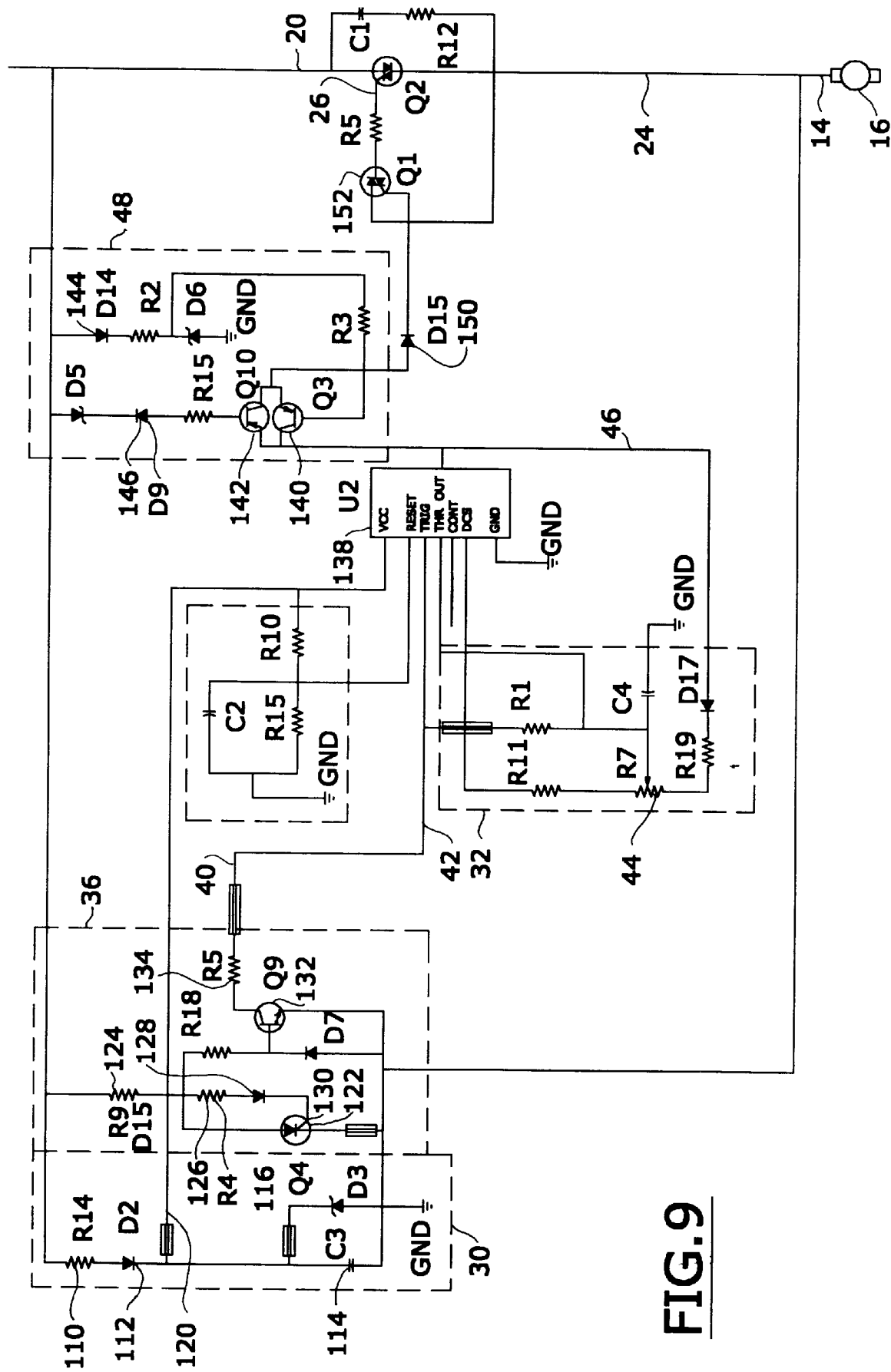
FIG. 9 is a detailed schematic drawing of the motor speed controller showing in block diagram form in FIG. 1.

FIG. 9 is a detailed schematic diagram of a fan controller in accordance with this invention, corresponding essentially to the block diagram of FIG. 1. Hot lead 12 is connected to pulse power supply 30. The pulse power supply includes a current limiting resistor 110, connected to a rectifier diode 112 that charges a relatively large capacitor 114, which is connected in parallel with a zener diode 116 to regulate the voltage across the capacitor to a safe value. The power supply is a half wave power supply, and capacitor 114 is selected to be large enough to provide relatively continuous power, even when triac 22 is conductive and essentially no voltage is supplied to the power supply. A relatively constant voltage appears at lead 120. Zero crossing detector 36 includes an SCR 122 connected to hot lead 12 through a current limiting resistor 124. SCR 122 is turned on each half cycle by voltage applied through resistor 126 and diode 128, which are connected in series to gate 130 of SCR 122. When SCR 122 is on, transistor 132 is turned off. Transistor 132 turns on each time the voltage across 122 approaches zero and produces a pulse at output lead 40 through current limiting resistor 134.

The zero crossing pulses are connected to the input of timer 138, which may be a 555 type versatile timer, the period of which is adjusted by potentiometer 44, which is connected thereto for providing pulses on output lead 46 that are connected to low energy pulse drive 48. Preferably, the values of potentiometer 44 and its associated resistors are selected so that timer 138 produces pulses, synchronized with the zero crossing, of between 16.67 and 833 milliseconds duration.

Low energy pulse drive circuit 48 includes first and second transistors 140 and 142, each having its emitter connected to hot lead 12 through a diode, 144 and 146 respectively, to turn one of the transistors on at the beginning of each half cycle of the voltage appearing at hot line 12. The transistors are preferably of opposite polarity. Transistor 140 is the NPN type, while transistor 142 is of the PNP type. Thus, whenever input 46 is high, a pulse is provided by way of diode 150 to the gate terminal 26 of triac 22 at the beginning of each half cycle to turn triac 22 on. Preferably, a control triac 152 is employed to reduce the power requirements of the low energy pulse drive 48.

While the invention has been described in connection with certainly preferred embodiments thereof, those skilled in the art will recognize that many modifications and changes may be made thereto without departing from the true spirit and scope of the invention, which accordingly is intended to be defined solely by the appended claims.

What is claimed is:

1. A single wire, low noise motor speed controller for a fan motor connected to a hot AC power line that provides AC drive power, and a neutral line comprising:

a power supply connected only between the hot AC power line and the motor for generating and storing power for operating the speed controller when the controller is on and there is no significant voltage across the controller;

a burst period generator connected only to the hot line for generating gating signals of a duration varying between a preselected minimum equal to at least one wavelength of the AC drive power to the motor, and a maximum; and a controlled switch connected in a single wire circuit between the hot line and a fan motor, and having a gate terminal connected to the burst period generator.

2. The motor speed controller of claim 1 comprising:

a zero crossing detector connected only to the hot line for generating pulses synchronized with the zero crossings of voltage on the hot line.

3. The motor speed controller of claim 2 in which the zero crossing detector is connected to the burst period generator and the output of the burst period generator is synchronized with the zero crossings.

4. The motor speed controller of claim 1 in which the controlled switch comprises a gated semiconductor switching device connected between the hot line and the motor.

5. The motor speed controller of claim 4 in which the gated switching device comprises a triac.

6. The motor speed controller of claim 5 comprising a low energy pulse driver connected to the triac.

7. The motor speed controller of claim 6 in which the low energy pulse driver comprises a circuit for providing a turn on pulse to the triac only after a current zero crossing.

8. A motor speed controller for a fan motor having low audible noise, comprising:

a linear switch connected between an AC power source and a motor, and having a gate terminal;

a pulse width modulated controller having a pulse width modulated output with a fundamental frequency above the audible range, connected to the gate terminal.

9. The motor speed controller of claim 8 connected in a circuit having a hot line and a neutral line in which the linear switch and the pulse width modulated controller are isolated from the neutral line.

10. The motor speed controller of claim 9 in which the circuit also comprises a ground line, and the pulse width modulated controller is connected to the ground line.

11. A motor speed controller for a fan motor having low audible noise, comprising:

a linear switch connected between an AC power source and a fan motor, and having a gate terminal;

a controller connected to the gate terminal for turning the linear switch on at each zero crossing, and turning the linear switch off at a selected phase during each half cycle and allowing the voltage to decay at a rate that minimizes the generation of harmonics.

12. The motor speed controller of claim 9 connected in a circuit having a hot line and a neutral line in which the linear switch and the pulse width modulated controller are isolated from the neutral line.

13. The motor speed controller of claim 12 in which the circuit also comprises a ground line, and the pulse width modulated controller is connected to the ground line.

14. A series connected, low noise motor speed controller for a fan motor connected to a hot AC power line that provides AC driven power, and a neutral line, in a circuit also including a ground line comprising:

a power supply connected only between the hot AC power line and the ground line, and isolated from the neutral line for generating and storing power for operating the speed controller when the controller is on and there is no significant voltage across the controller;

a burst period generator isolated from the neutral line for generating gating signals of a duration varying between a preselected minimum equal to at least twice the wavelength of the AC drive power to the motor, and a maximum; and a controlled switch connected in the hot line in series with a fan motor, and having a gate terminal connected to the burst period generator.

* * * * *

UNITED STATES PATENT AND TRADEMARK OFFICE
CERTIFICATE OF CORRECTION

PATENT NO. : 6,010,310
DATED : January 4, 2000
INVENTOR(S) : Bruce F. Macbeth

It is certified that error appears in the above-identified patent and that said Letters Patent is hereby corrected as shown below:

ON THE FACE OF THE PATENT

Inventor's (applicant's) Name:

from: Bruce F. MacBeth    to:    Bruce F. Macbeth

Please delete the capital letter "B" to read --b--.

Signed and Sealed this

Tenth Day of April, 2001

Attest:

NICHOLAS P. GODICI

Attesting Officer    Acting Director of the United States Patent and Trademark Office